Figure 3:
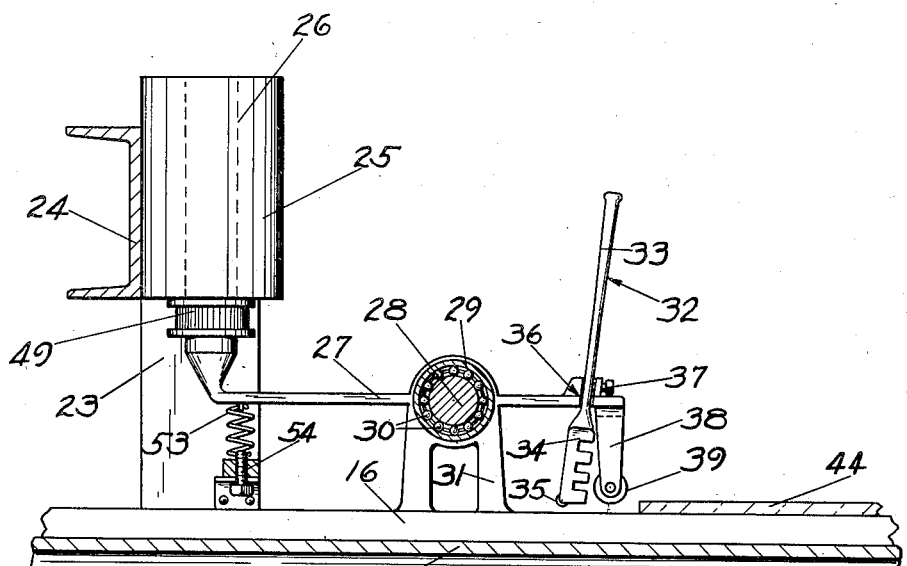

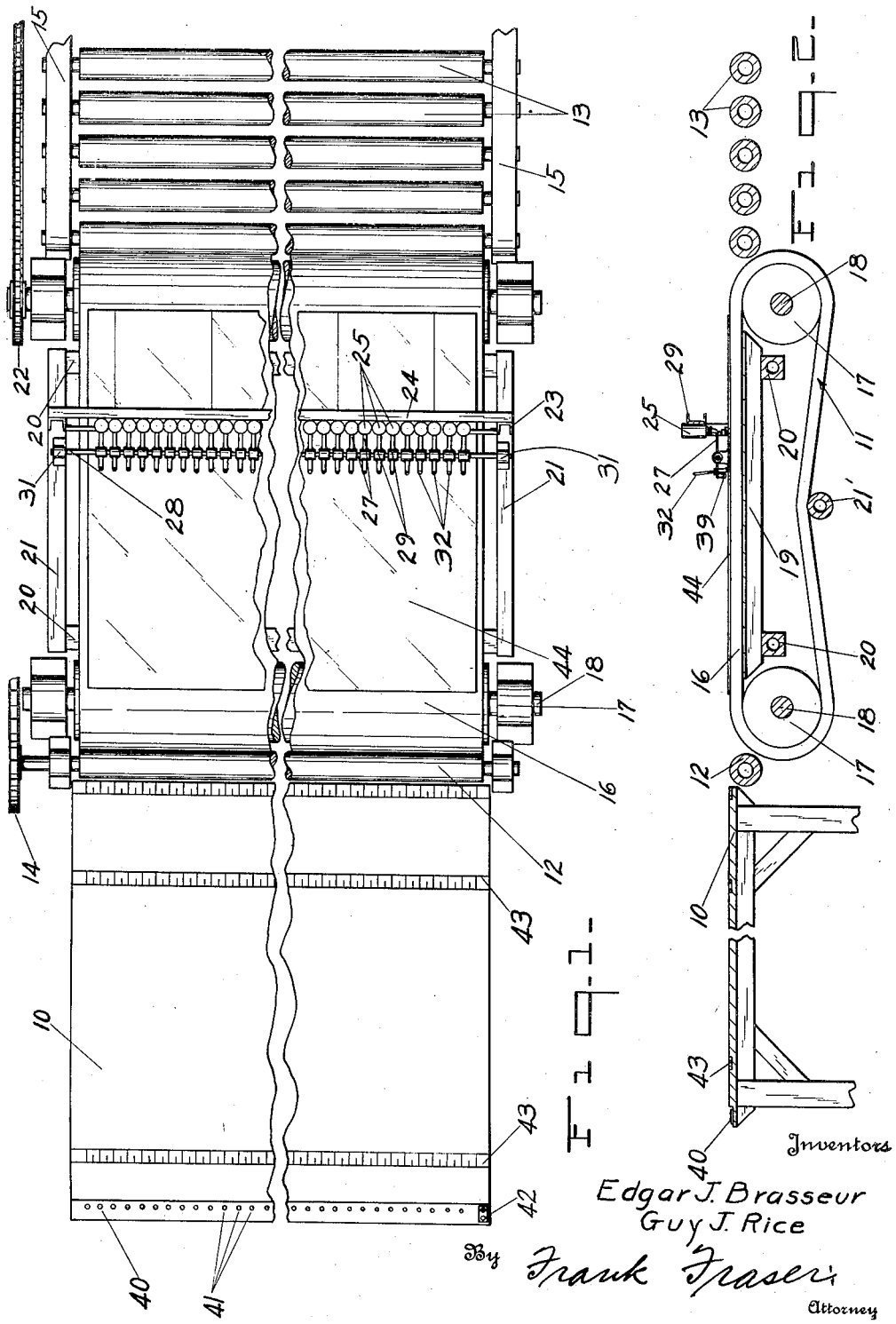

Aug. 21, 1934.  E. J. BRASSEUR ET AL  1,970,930
GLASS CUTTING APPARATUS
Original Filed Dec. 4, 1926  2 Sheets-Sheet 2

Inventors
Edgar J. Brasseur
Guy J. Rice
By Frank Fraser
Attorney

Patented Aug. 21, 1934

1,970,930

UNITED STATES PATENT OFFICE 1,970,930

GLASS CUTTING APPARATUS

Edgar J. Brasseur and Guy J. Rice, Charleston, W. Va., assignors to Libbey-Owens-Ford Glass Company, Toledo, Ohio, a corporation of Ohio Application December 4, 1926, Serial No. 152,543
Renewed May 23, 1933

7 Claims. (Cl. 33—32)

This invention relates to improvements in glass cutting apparatus and more particularly to an apparatus for cutting sheets of glass into strips of the desired width.

The present invention is designed to do away with the operation of hand cutting as now carried out. This hand cutting is not only very expensive, demanding highly skilled labor, but also gives a relatively large percentage of breakage and waste from imperfect cutting or accidental moving of the gage. The present invention is designed to overcome these difficulties and to greatly reduce the cost.

An important object of the present invention is to provide improved glass cutting apparatus of simple design and easy adjustment which will render it possible for a relatively unskilled operator to cut sheets of glass rapidly and accurately.

Another object of the invention is to provide improved glass cutting apparatus embodying an arrangement which will adapt itself to plate glass of different thicknesses, and also to glass which may not be perfectly flat.

Another object of the invention is to provide improved glass cutting apparatus which is so designed that the cutting tool will not strike against the cutting table after the said tool passes out of engagement with the sheet of glass that has just been cut.

Another object of the invention is to provide, in glass cutting apparatus of the above character, a plurality of cutters and separate means for individually operating each of the cutters to move the same into cutting position whereby a plurality of cuts may be simultaneously made.

Another object of the invention is the provision of a single means for simultaneously moving all of the cutters which are in cutting position out of such position and into inoperative position at the completion of the cutting operation.

A further object of the invention is to provide, in glass cutting apparatus, a plurality of cutters, a separate electro-magnetic control for individually moving each of said cutters into cutting position, and a single means for simultaneously causing all of the cutters to be moved out of cutting position, at the completion of the cutting operation.

A further object of the invention is to provide, in glass cutting apparatus, a plurality of cutters, means for actuating said cutters, and a movable table for carrying the sheets to be cut beneath said cutters.

A still further object of the invention is the provision of means engageable by the glass sheets prior to the cutting thereof for adjusting the cutters to the desired position according to the thickness of the sheet to be cut.

Still another object of the invention is to provide improved glass cutting apparatus of the above character which will be relatively simple and economical of construction, yet positive and reliable in its operation.

Other objects and advantages of the invention will become more apparent during the course of the following description when taken in connection with the accompanying drawings.

Figure 4:
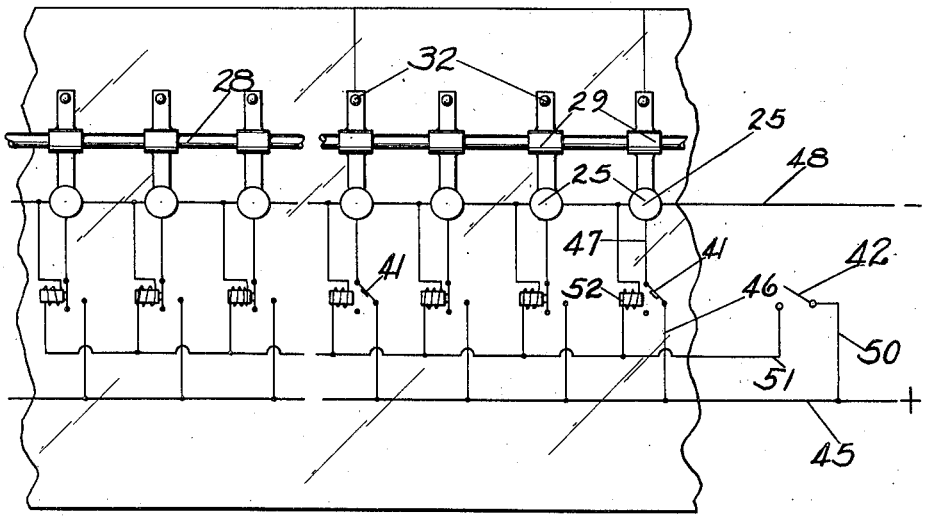

In the drawings forming a part of this application and wherein like numerals are employed to designate like parts throughout the same, Fig. 1 is a top plan view of improved glass cutting apparatus constructed in accordance with the present invention, Fig. 2 is a side view thereof, Fig. 3 is an enlarged detail view of one cutter assembly, and Fig. 4 is a diagrammatic view of the electrical wiring.

Referring now more in detail to the accompanying drawings, the present invention embodies in its construction an inspection table 10 for receiving the glass sheets prior to the cutting thereof, and a movable cutting table 11 for carrying the glass sheets beneath a plurality of cutters as will be more clearly hereinafter apparent.

A conveying roller 12 is arranged between the inspection table 10 and cutting table 11 for conveying the glass sheets to be cut from the former onto the latter while a plurality of horizontally aligned rollers 13 form a receiving table for receiving the glass as it leaves the cutting table 11. It is to be noted that the upper surfaces of the inspection table 10, cutting table 11, receiving rollers 13 and conveying roller 12 are all in horizontal alignment with one another. The conveying roller 12 is preferably driven by means of a suitable chain and sprocket connection or the like 14, while the rollers 13 are loosely journaled at their opposite ends in bearings 15.

The cutting table 11 comprises an endless conveyor belt 16 trained about rollers 17 mounted on transverse shafts 18. The upper run of the conveyor belt 16 is supported upon suitable flat horizontal rails or the like 19 which are carried by transverse supports 20, said supports extending outwardly beyond the sides of the conveyor belt 16 and being connected by longitudinally extending bars or the like 21. An idler roll 21' engaging the lower run of the conveyor belt 16 serves to prevent sagging thereof and further functions to retain the same in a taut condition. The conveyor belt 16 is adapted to be positively rotated by means of a chain and sprocket connection or the like 22 associated with one of the shafts 18 and preferably with that shaft adjacent the receiving rollers 13.

Carried by the bars 21 at opposite sides of the cutting table 11 are a pair of oppositely disposed uprights 23 to which is secured a suitable supporting beam 24 which extends the entire width of the said cutting table. This supporting beam 24 which is positioned at a desired distance above the cutting table 11 has secured thereto a plurality of cutters and these cutters are preferably although not necessarily spaced about one inch apart.

Each cutter assembly comprises a solenoid 25 secured to the beam 24 and including the usual plunger 26 which is arranged in a vertical position as shown. Secured to the lower end of the plunger 26 is a rockable lever or arm 27 pivotally mounted intermediate its ends upon a shaft 28, said lever being formed with an enlarged bearing portion 29 for receiving the shaft 28 therethrough. Roller bearings 30 are arranged within the bearing portion 29 to facilitate free rocking movement of the lever 27. The shaft 28 extends the entire width of the cutting table 11 and the opposite ends thereof are received within bearings 31 which are also carried by the bars 21 in advance of the uprights 23.

Carried by each of the levers 27 adjacent the forward end thereof is a cutter 32 of the conventional hand type and which comprises a shank or handle 33 and a head 34 carrying the usual cutting wheel 35. Of course, any other type of cutter found suitable may be substituted for the one illustrated without departing from the spirit of the invention and a diamond may be substituted for the cutting wheel 35 if found more desirable. The cutter 32 is secured in position by passing the handle 33 thereof through an opening 36 in the lever 27 and securing the same therein by means of a suitable set screw or the like 37. Each of the levers 27 is further provided at its forward end and in advance of the cutter 32 with a depending lug 38 having journaled in its lower end a roller 39, the purposes of which will be more specifically hereinafter described.

In accordance with the present invention, the inspection table 10 is provided at its forward edge with a keyboard 40 including a plurality of individual switches 41, one switch being provided for each of the solenoids 25 so that upon operation of any one of the switches, the solenoid with which it is associated will be energized to move the corresponding cutter into cutting position. A master switch 42 is also provided at one end of the keyboard 40 and this switch is so associated with the solenoids 25 that upon the operation thereof, all of said solenoids which are energized will be simultaneously de-energized in order that all of the cutters which may have been previously moved into cutting position will be simultaneously moved out of such position. The inspection table 10 is further provided with one or any preferred number of rulers 43 which are counter-sunk within the upper surface thereof and these rulers aid the operator in determining the point or points at which the sheet should be scored.

In the operation of the present invention, the sheet of glass 44 to be cut is first placed upon the inspection table 10 and after the workman has inspected the same, he operates the desired key or keys 41 according to the point or points at which he wishes to score the sheet. The sheet is then pushed along until it engages the conveying roller 12 and is carried thereby onto the rotatable cutting table 11. This cutting table carries the sheet beneath the cutters 32 and those cutters which have been previously brought into cutting position by the operation of the keys 41 serve to score the sheet along the desired lines. The scored sheet is then passed from the cutting table onto the receiving rollers 13 where it is broken along the scored lines into strips of the desired width. The next sheet can then be cut along the same lines, without as will be apparent, re-setting the cutters but should it be desired to cut the sheet differently, the operator need simply press the master switch 42 whereupon all of the cutters will be moved into inoperative position after which he can again operate the proper key or keys 41 to move the desired cutter or cutters into cutting position. After the sheet has been cut into strips of the desired width, these strips can again be passed through the apparatus and cut transversely into lights of various and preferred sizes.

As shown in Fig. 4, when any one of the switches 41 is closed, the electric current will enter through the wire 45 and pass through the wire 46, switch 41, wire 47 into and through the solenoid 25 and subsequently out through the wire 48. As the current passes through the solenoid 25, it energizes the same and when this is done, the plunger 26 will be drawn upwardly to rock the lever 27 about the shaft 28 whereby to lower the cutter 32 into cutting position. A collar or sleeve 49 surrounding the plunger 26 abuts the lower end of the solenoid 25 to limit the upward movement of said plunger. With such an arrangement, it will be seen that one or any number of the switches 41 may be closed to move the corresponding cutter or cutters into cutting position whereby a plurality of cuts may be simultaneously made.

When it is desired to move the cutters 32 out of cutting position, the master switch 42 is closed whereupon the current will pass through the wire 50, master switch 42, wire 51, through the electro-magnets 52, and out through the wire 48. Upon the energization of the electro-magnets 52, the adjacent switches 41 will be attracted thereby and consequently opened so as to break the circuit through the solenoids 25. When any one of the solenoids is de-energized, the plunger 26 will be automatically pulled downwardly by a suitable spring 53 whereby to rock the lever 27 in the opposite direction so as to raise the cutter 32 away from the cutting table and out of cutting position. A screw 54 to which one end of the spring 53 is secured, is provided in order that the tension of the said spring may be increased or lessened as desired. From the above, it will be appreciated that all of the switches 41 which may have been previously closed will be simultaneously opened upon the energization of the electro-magnets 52 whereby to simultaneously move all of the cutters out of cutting position.

The rollers 39 carried by the depending lugs 38 are provided in order that the position of the cutters 32 may be properly and finely adjusted according to the thickness of the sheet to be cut. It will be appreciated that as the glass sheet 44 engages the rollers 39 it will act to rock the levers 27 on the shaft 28 in order to raise the cutters 32 to the proper position. In accordance with such an arrangement, it will be seen that glass sheets of various thicknesses may be quickly and accurately cut.

While solenoids have been illustrated and described herein for controlling the cutters 32, yet it is to be understood that any other desired and suitable type of magnet or electro-magnet may be employed without departing from the spirit of the invention and that furthermore, any preferred system of electrical wiring may be employed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In glass cutting apparatus, means for supporting the glass, a plurality of cutters, an electro-magnet for controlling each cutter respectively, means for individually and selectively energizing each electro-magnet to move the corresponding cutter into cutting position, means for simultaneously de-energizing all of said energized electro-magnets, and means for moving all of the corresponding cutters out of cutting position upon de-energization of said magnets.

2. In glass cutting apparatus, a table for the glass, a plurality of cutters arranged above the table, electrically operated means for individually and selectively moving the cutters into engagement with the glass, and electrical means for rendering the said electrically operated means inoperative whereby to control the moving of all of said cutters out of engagement with the glass at the completion of the cutting operation.

3. In glass cutting apparatus, a table for the glass, a plurality of cutters arranged above the table, an electro-magnet for controlling each cutter, an individual switch having connection with each electro-magnet for causing the energization thereof when the same is closed, a master switch and an electro-magnet associated with each individual switch for opening the same upon operation of the said master switch.

4. In glass cutting apparatus, means for supporting the glass, a plurality of cutters, a separate control means for controlling each cutter respectively, means for individually and selectively actuating each control means to render it effective to move the corresponding cutter into cutting position, means for simultaneously rendering all of said control means ineffective, and means for moving all of the corresponding cutters out of cutting position upon rendering of the said control means ineffective.

5. In glass cutting apparatus, means for supporting the glass, a plurality of cutters, a separate control device for controlling each cutter respectively, means for individually and selectively actuating each control device to render it effective to move the corresponding cutter into cutting position, means for simultaneously rendering all of said control devices ineffective, and spring means for moving all of the corresponding cutters out of cutting position upon rendering of the said control devices ineffective and for maintaining them in such position.

6. In glass cutting apparatus, a table for the glass, a plurality of cutters arranged above the table, means for individually and selectively moving the cutters into engagement with the glass, means for rendering the said last mentioned means inoperative, and means for moving all of the cutters previously moved into engagement with the glass out of such engagement upon rendering of the said first-named means inoperative.

7. In glass cutting apparatus, a table for the glass, a plurality of cutters arranged above the table, means for individually and selectively moving the cutters into engagement with the glass, electrical means for rendering the last mentioned means inoperative, and spring means for moving all of the cutters previously moved into engagement with the glass out of such engagement upon rendering of the said first-named means inoperative.

EDGAR J. BRASSEUR.
GUY J. RICE.